US009586507B2

(12) United States Patent
Correia et al.

(10) Patent No.: US 9,586,507 B2
(45) Date of Patent: Mar. 7, 2017

(54) MOTOR VEHICLE SEAT HAVING A REVERSIBLE SITTING PART COMPRISING LOCKING MEANS

(71) Applicant: RENAULT s.a.s., Boulogne Billancourt (FR)

(72) Inventors: Miguel Correia, Pierres (FR); Guillaume Brotonne, Septeuil (FR); David Lancelot, Gemigny (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/771,986

(22) PCT Filed: Feb. 17, 2014

(86) PCT No.: PCT/FR2014/050315
§ 371 (c)(1),
(2) Date: Sep. 1, 2015

(87) PCT Pub. No.: WO2014/131963
PCT Pub. Date: Sep. 4, 2014

(65) Prior Publication Data
US 2016/0016497 A1 Jan. 21, 2016

(30) Foreign Application Priority Data

Mar. 1, 2013 (FR) ..................................... 13 51869

(51) Int. Cl.
*A47C 13/00* (2006.01)
*B60N 2/68* (2006.01)
(Continued)

(52) U.S. Cl.
CPC ............. *B60N 2/682* (2013.01); *B60N 2/005* (2013.01); *B60N 2/015* (2013.01); *B60N 2/0292* (2013.01);
(Continued)

(58) Field of Classification Search
CPC ........ B60N 2/005; B60N 2/015; B60N 2/366; B60N 2/0292; B60N 2/442; B60N 2/682
(Continued)

(56) References Cited

U.S. PATENT DOCUMENTS

| 12,357 | A | * | 2/1855 | Carpenter | ............... | A47C 13/00 |
| | | | | | | 297/1 X |
| 380,170 | A | * | 3/1888 | Blydenburhg | ......... | A47C 13/00 |
| | | | | | | 297/105 |

(Continued)

FOREIGN PATENT DOCUMENTS

| DE | 3132096 A1 * | 3/1983 | ............... A47C 3/20 |
| DE | 3151954 A1 * | 7/1983 | ............. A61G 3/005 |

(Continued)

OTHER PUBLICATIONS

International Search Report Issued Apr. 17, 2014 in PCT/FR14/050315 Filed Feb. 17, 2014.
(Continued)

*Primary Examiner* — Rodney B White
(74) *Attorney, Agent, or Firm* — Oblon, McClelland, Maier & Neustadt, L.L.P.

(57) ABSTRACT

A motor vehicle seat including a seatback part and a sitting part, the sitting part including a base panel bordered at least partially by a side panel, and a mechanism mounting the seat on the vehicle floor panel in two different positions: a first accommodating position in which the side panel extends at least partially in an extension of the seatback part, between the seatback part and the sitting part base panel, and a second reversed position in which the base panel extends between the seatback part and the side panel of the sitting part. The motor vehicle seat further includes a mechanism locking the sitting part in at least one of the two accommodation and
(Continued)

reversed positions, at least part of the locking mechanism belonging to the seatback part.

14 Claims, 6 Drawing Sheets

(51) Int. Cl.
*B60N 2/005* (2006.01)
*B60N 2/015* (2006.01)
*B60N 2/36* (2006.01)
*B60N 2/02* (2006.01)
*B60N 2/44* (2006.01)

(52) U.S. Cl.
CPC ............ *B60N 2/366* (2013.01); *B60N 2/442* (2013.01); *B60N 2002/4455* (2013.01); *B60N 2002/684* (2013.01)

(58) Field of Classification Search
USPC ............ 297/1, 3, 15, 105, 108, 130, 188.08, 297/188.12, 440.15, 440.16
See application file for complete search history.

(56) References Cited

U.S. PATENT DOCUMENTS

| | | | | |
|---|---|---|---|---|
| 1,412,139 A * | 4/1922 | Schechter | .......... | B61D 33/0085 297/101 |
| 1,887,947 A * | 11/1932 | Savale | ................. | B60N 2/3011 296/66 |
| 2,572,435 A * | 10/1951 | White | ................... | A47B 83/02 297/1 X |
| 3,243,228 A * | 3/1966 | Watts | ....................... | B60N 2/14 248/424 |
| 3,246,926 A * | 4/1966 | Link | ...................... | B60N 2/203 297/118 |
| 4,010,977 A * | 3/1977 | Rahman | ................. | B60N 2/203 297/364 |
| 4,072,343 A * | 2/1978 | Meza | ..................... | B60N 2/143 248/429 |
| 4,252,368 A * | 2/1981 | Miller | ...................... | B60N 2/38 297/112 |
| 4,521,052 A * | 6/1985 | Cone | ........................ | A47D 1/02 297/1 |
| 5,125,717 A * | 6/1992 | Skold | ..................... | B60N 2/286 297/3 X |
| 5,409,293 A * | 4/1995 | Nagasaka | ................ | B60N 2/26 297/105 |
| 6,019,413 A * | 2/2000 | Scraver | ................ | B60N 2/3013 297/3 X |
| 6,024,397 A * | 2/2000 | Scraver | ................ | B60N 2/3013 297/3 X |
| 6,957,853 B2 * | 10/2005 | Williams | ............... | B60N 2/203 297/93 |
| 7,029,421 B2 | 4/2006 | Henneken et al. | | |
| 7,093,899 B2 * | 8/2006 | Fisher | .................. | B60N 2/3065 297/3 X |
| 9,145,656 B2 * | 9/2015 | Ortega | .................... | E02F 9/166 |
| 2016/0016487 A1 * | 1/2016 | Correia | .................. | B60N 2/643 297/94 |

FOREIGN PATENT DOCUMENTS

| | | |
|---|---|---|
| DE | 10 2008 045 859 | 3/2009 |
| FR | 2 950 005 | 3/2011 |
| FR | 2 961 760 | 12/2011 |
| JP | 03178837 A * | 8/1991 |
| WO | 02 097308 | 12/2002 |

OTHER PUBLICATIONS

French Search Report Issued Nov. 21, 2013 in Application No. FR 1351869 Filed Mar. 1, 2013.

* cited by examiner

MOTOR VEHICLE SEAT HAVING A REVERSIBLE SITTING PART COMPRISING LOCKING MEANS

TECHNICAL FIELD OF THE INVENTION

The present invention relates to a motor vehicle seat comprising a seatback part and a sitting part, said sitting part comprising a base panel bordered at least partially by a side panel and means for mounting on the floor of the vehicle in two different positions: a first accommodating position in which the side panel runs at least partially in the extension of the seatback part, between said seatback part and the base panel of the sitting part, and a second reversed position in which the base panel extends between the seatback part and the side panel of the sitting part.

The invention also relates to a motor vehicle comprising such a seat.

The invention finally relates to a method for reversing such a seat.

TECHNOLOGICAL BACKGROUND OF THE INVENTION

A seat as described in the introduction is disclosed, in particular, in the document FR 2950005.

This seat more specifically comprises an edge which extends along the side panel thereof and cooperates with the peripheral edge of an opening of the floor of the vehicle for the positioning thereof in its accommodating and reversed positions.

By a reversal of the sitting part, such a seat makes it possible to pass from a position in which the base panel is lowered and the sitting part forms an integral molded seat designed to accommodate a passenger of the vehicle, into a position in which the base panel is raised and the sitting part forms a cover for a housing formed below the seat.

The housing may thus serve as a storage compartment.

A drawback with this solution is that the sitting part is not able to be locked in either of its two positions. As a result, the closure of the housing formed below the seat is not able to be secured and the positioning of the sitting part to form the seat of the integral molded type is not able to be secured either.

SUBJECT OF THE INVENTION

In order to remedy the aforementioned drawback of the prior art, the present invention proposes a novel motor vehicle seat in which the sitting part may be locked in at least one of its two positions, whilst permitting simple and rapid reversal of the sitting part.

More particularly, according to the invention, a seat is proposed as described in the introduction in which locking means of the sitting part in at least one of the two accommodating and reversed positions are further provided, at least some of these locking means belonging to said seatback part.

Due to the seat according to the invention, therefore, it is possible to lock the sitting part, either in its accommodating position so as to prevent the removal of the sitting part used as a seat by a passenger or in its reversed position so as to secure the closure of the housing formed below the seat when the sitting part forms a storage compartment. The part of the locking means belonging to the seatback part is thus designed to cooperate with the sitting part in these two positions.

These locking means also lock the position of the seatback part.

These locking means are, for example, locking means comprising a key which are easily lockable and unlockable, so that it is simple to open and close in a secure manner the storage compartment formed by the sitting part in the reversed position. It is also simple to lock/unlock the sitting part to permit it to pass from one to the other of these two positions.

Further features of the seat according to the invention which are non-limiting and advantageous are as follows:
- the sitting part further comprises means for hooking designed to cooperate, in at least one of its accommodating and reversed positions, with complementary means for hooking of the seatback part;
- said means for hooking of the sitting part on the seatback part comprise a first means for hooking on the seatback part in the accommodating position and a second means for hooking on the seatback part in the reversed position, each being designed to cooperate with the same complementary means for hooking of the seatback part;
- said complementary means for hooking of the seatback part comprises a hooking lug which protrudes from said seatback part and each first and second means for hooking of the sitting part comprises an orifice designed to be traversed by said hooking lug in the corresponding accommodating or reversed position of the sitting part;
- the means for mounting of the sitting part permit its displacement from each of its accommodating and reversed positions into released positions so as to release the means for hooking of the sitting part from their cooperation with said complementary means for hooking of the seatback part, and permitting its displacement in the opposing direction, so as to establish the cooperation of the means for hooking of the sitting part with said complementary means of the seatback part;
- said locking means are designed to prevent the displacement of the sitting part in each of the accommodating and reversed positions;
- as said means for mounting of the sitting part on the floor of the vehicle are designed to cooperate with at least one mounting lug of the floor of the vehicle, each of said first and second means for mounting of the sitting part comprises at least one receiving slot which is designed to be traversed by said mounting lug;
- said locking means comprise, on the one hand, a locking element belonging to the seatback part and designed to be displaced between a locked position and a released position and, on the other hand, a housing belonging to said sitting part and designed to accommodate said locking element in the locked position, the locking element in the locked position and the housing of the sitting part being arranged such that any displacement of the sitting part is prevented;
- the seatback part comprises at least one removable part designed to be entirely detached from the remainder of the seat;
- said locking means of the sitting part are carried by said removable part of the seatback part and are designed to prevent any displacement of this removable part of the seatback part.

The invention also relates to a motor vehicle comprising a seat such as described above and a floor provided with complementary means for mounting designed to cooperate for retention with said means for mounting said seat in each of its accommodating and reversed positions.

Said complementary means for mounting may be attached to the floor or integrated therein.

The invention finally relates to a method for reversing the sitting part of the motor vehicle seat, said seat initially being in its accommodating position, comprising the following steps:
- unlocking said locking means,
- displacing said sitting part into the corresponding released position in which the means for hooking in the accommodating position are released from their cooperation with the complementary means for hooking of the seatback part,
- displacing the sitting part so as to release the means for mounting in the accommodating position from their cooperation with the complementary means for mounting of the floor of the vehicle,
- returning the sitting part so as to arrange its base panel between the seatback part and its side panel,
- placing the means for mounting in the reversed position in cooperation with said complementary means for mounting of the floor of the vehicle,
- displacing said sitting part into the reversed position so as to establish the cooperation between the means for hooking of the sitting part (20) in the reversed position and the complementary means for hooking of the seatback part (10),
- locking said locking means.

DETAILED DESCRIPTION OF AN EMBODIMENT

The description which follows with reference to the accompanying drawings and provided by way of non-limiting example will provide clear understanding of the invention and how it may be implemented.

Firstly, it should be noted that the terms "front" and "rear", on the one hand, and the terms "upper" and "lower", on the other hand, will be used in the description with reference to the conventional orientation of a seat in a motor vehicle, in which the passenger seated on the seat faces the road in the forward direction.

Device

A seat 100 for a motor vehicle according to the invention is shown in FIGS. 1, 2, 3 and 9.

This seat 100 comprises a seatback part 10 and a sitting part 20.

The seatback part 10 in this case comprises an upper removable part 11 and a lower fixed part 12. The fixed part 12 of the seatback part 10 is fixed in a non-removable manner to the structure of the passenger compartment of the vehicle.

The removable part 11 comprises a framework covered by a textile covering 11A. It is mounted on the fixed part 12 of this seatback part 10.

This seatback part 10 is designed to extend substantially vertically in the motor vehicle according to the invention.

The sitting part 20 is shown, in the examples illustrated here, as a molded shell. It is produced, for example, from plastics material.

Figure 1:
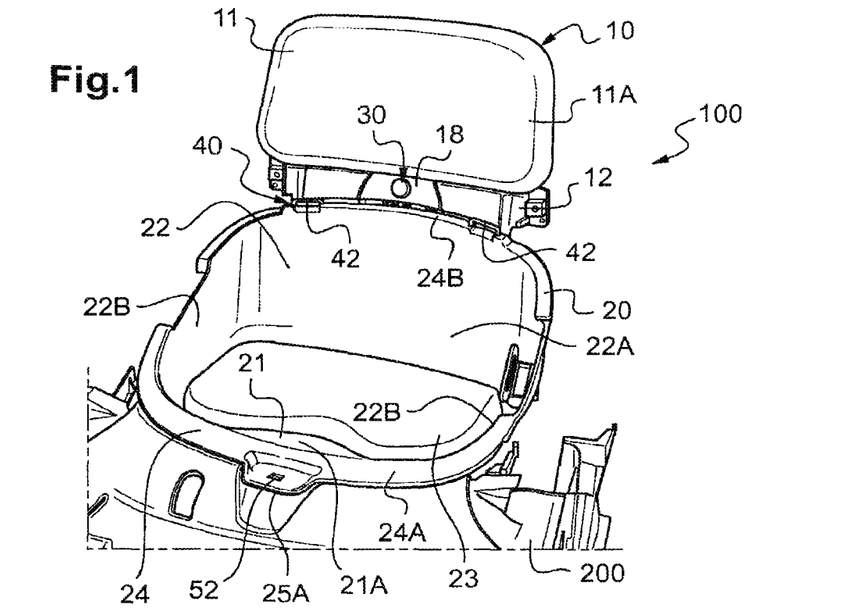
FIG. 1 is a schematic perspective view of the seat according to the invention with the sitting part in its accommodating position.
Figure 2:
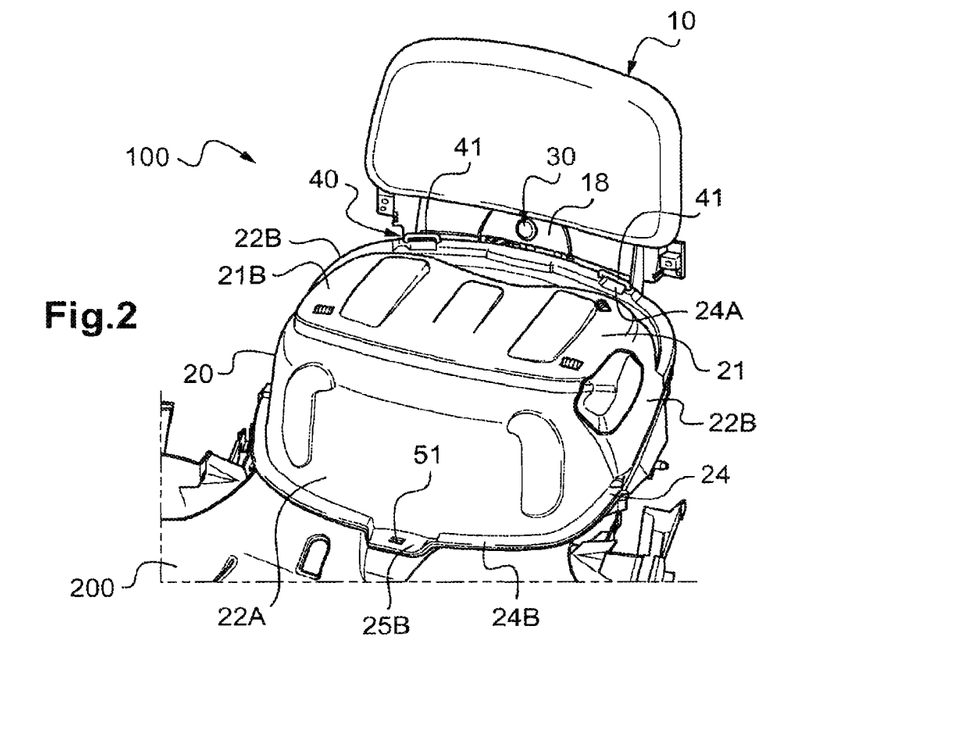
FIG. 2 is a schematic perspective view of the seat of FIG. 1 with the sitting part in its reversed position.
Figure 3:
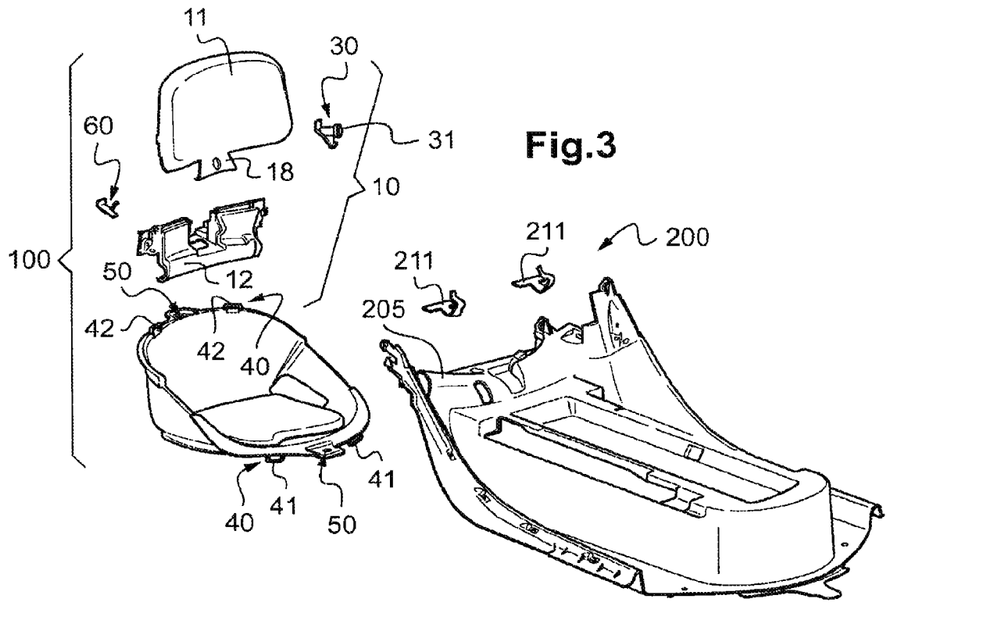
FIG. 3 is a schematic exploded view of the seat of FIG. 1 and of the floor of the vehicle according to the invention.

This sitting part 20 comprises a base panel 21 bordered at least partially by a side panel 22 and is designed to be mounted in the vehicle in two different positions: a first accommodating position, shown in FIG. 1, and a second reversed position, shown in FIG. 2, in which the sitting part 20 has been reversed by 180 degrees about an axis generally parallel to the base panel 21 and to the seatback part 10.

In these two positions, the base panel 21 of the sitting part 20 is designed to extend substantially horizontally in the motor vehicle.

The base panel 21 comprises an upper face 21A oriented toward the passenger in the accommodating position of the sitting part 20 and an opposing lower face 21B (FIG. 2) oriented toward the floor 200 of the vehicle in this accommodating position. A seat cushion 23 is provided on the upper face 21A of the base panel 21 (FIG. 1).

Here the base panel 21 has a generally rectangular shape, with very rounded corners. The side panel 22 in this case borders this base panel 21 along three first sides. It thus comprises a central portion 22A which extends along a longitudinal side of the base panel 21 and two end portions 22B which extend along the lateral sides of the base panel 21.

The second longitudinal side of the base panel 21, not bordered by the side panel 22, will be called hereinafter the front side of the base panel 21.

The free edge of the side panel 22 and the front side of the base panel 21 are surrounded by an edge 24 which extends toward the outside of the sitting part 20.

The part of this edge 24 which extends along the front side of the base panel 21 will be called hereinafter the front edge 24A of the sitting part 20. The part of this edge 24 which extends along the central portion 22A of the side panel 22 will be called hereinafter the rear edge 24B of the sitting part 20.

The side panel 22 rises from the upper face 21A of the base panel 21 and has a height relative to this base panel 21 which is variable.

More specifically, the height of the side panel 22 in this case is at a maximum on the central portion 22A bordering the part of the base panel 21 opposing said fourth side of the base panel 21. It then decreases along the end portions 22B of the side panel 22 until it joins the base panel 21 in the region of the front side thereof.

In the accommodating position of the sitting part (FIG. 1), the base panel 21 generally runs in the extension of the floor 200 of the vehicle. It thus seals an opening formed below the seat 100 in the floor 200.

The front edge 24A of the sitting part 20 is then oriented toward the front of the vehicle.

The central portion 22A of the side panel 22 thus runs in the extension of the seatback part 10 between this seatback part 10 and the base panel 21 of the sitting part 20. This central portion 22A of the side panel 22 thus forms, with the seatback part 10, the seatback of the seat 100.

It is understood that the central portion 22A of the side panel 22 is thus oriented toward the rear of the vehicle.

In this accommodating position, the sitting part 20 permits the user to be seated on the seat cushion 23 provided on the upper face 21A of the base panel 21. The user leans back against the central portion of the side panel 22 and the seatback part 10. The legs of the user pass over the front edge 24A of the sitting part 20.

In the reversed position of the sitting part (FIG. 2) the base panel 21 extends between the seatback part 10 and the side panel 22 of the sitting part 20.

The lower face 21B of the base panel 21 is oriented toward the user and the upper face 21A of the base panel 21 is then oriented toward the floor 200 of the vehicle. Finally, the central portion 22A of the side panel 22 of the sitting part 20 is oriented toward the front of the vehicle.

In this reversed position, the base panel 21 is raised relative to the floor of the vehicle by the side panel 22. As a result, the sitting part 20 in this case delimits internally a housing where the user is able to store personal effects. This housing is all the larger since it is preferably located above the opening of the floor mentioned above. This opening of the floor 200 opens into a free space located below the seat.

The sitting part 20 thus forms a storage compartment.

It is also possible to use the sitting part placed in this reversed position as a booster seat so as to form a seat for a child.

It should be noted that the seat 100 according to the invention further comprises locking means 30 of the sitting part 20, in at least one of the two accommodating and reversed positions, at least some of these locking means 30 belonging to said seatback part 10 of the seat 100.

Thus, when these locking means block the sitting part in the accommodating position the mounting of the sitting part may be secured, whilst permitting easy unlocking for the reversal of this sitting part.

When these locking means block the sitting part in the reversed position, the closure of the storage compartment may be secured so as to guarantee protection against tampering by third parties.

Preferably, as is the case in the example shown, the locking means 30 of the seat 100 permit the sitting part 20 to be locked in its two accommodating and reversed positions.

In this case, the locking means 30 comprise a locking element designed to be displaced between a locked position in which any displacement of the sitting part is prevented and a released position in which the displacement of the sitting part is permitted.

Advantageously, the positioning of this locking element is controlled by a control means forming part of the locking means which may be removable.

This control means may, for example, be mechanical, for example in the form of a key, or electrical, in the form of a digital key actuating an electrical actuator, for example.

Moreover, at least some of these locking means, as explained below in more detail, belong to the removable part 11 of the seatback part 10. The locking means which permit the sitting part to be locked in its two accommodating and reversed positions, i.e. which permit the sitting part to be blocked in each of its positions, also enables the removable part 11 of the seatback part 10 to be locked, by blocking any movement of this removable part, which prevents its removal from the seat 100.

These locking means 30 comprise in this case a single lock 31 belonging to the seatback part 10 and means for cooperation 70 with this lock in the two accommodating and reversed positions belonging to the sitting part 20.

This lock 31 comprises a cylinder in which a key may be inserted so as to actuate means for the displacement of a bolt forming said locking element. This bolt is, for example, in the form of a bar.

The bolt is designed to be displaced between a locked position and a released position of the sitting part 20.

The means for cooperation 70 with the lock 31 of the sitting part 20 comprise first means for cooperation 71 with the lock 31 in the accommodating position and second means for cooperation 72 with this lock 31 in the reversed position.

More specifically, in the example shown in the figures, each of the front 24A and rear 24B edges of the sitting part 20 comprises a central tongue 25A, 25B protruding from this edge toward the outside of the sitting part, said tongue corresponding to a portion of the edge which has a greater width than the remainder of the edge.

Each tongue 25A, 25B comprises a hollow portion 71, 72 forming a housing designed to accommodate the bolt in the locked position.

In this case, therefore, these hollow portions 71, 72 each act as a keeper of the lock 31 in one of the positions of the sitting part and form the first and second means for cooperation 71, 72.

In order to ensure the securing of the sitting part 20 of the seat 100 in the vehicle, the sitting part 20 comprises means for mounting 40 on the floor 200 of the vehicle in its two accommodating and reversed positions.

These means for mounting 40 are designed to cooperate with complementary means for mounting 210 of the floor of the vehicle.

To this end, the sitting part 20 comprises first means for mounting 41 designed to cooperate with the complementary means for mounting 210 of the floor 200 in the accommodating position and second means for mounting 42 designed to cooperate with the same complementary means for mounting 210 of the floor 200 in the reversed position.

Moreover, in this case the sitting part 20 of the seat 100 comprises means for hooking 50, designed to cooperate in at least one of its accommodating and reversed positions with complementary means for hooking 60 of the seatback part.

In this case, it is advantageously provided that the sitting part 20 comprises means for hooking 50 designed to cooperate with said complementary means for hooking 60 of the seatback part 10 in the two accommodating and reversed positions.

The sitting part 20 thus comprises first means for hooking 51 designed to cooperate with complementary means for hooking 60 of the seatback part 10 in the accommodating position and second means for mounting 52 designed to cooperate with the same complementary means for hooking 60 of the seatback part 10 in the reversed position.

All of the means for cooperation 71, 72 with the lock 31 of the sitting part, the means for mounting 41, 42 on the floor 200 and the means for hooking 51, 52 on the seatback part 10 are arranged on the front 24A and rear 24B edges of the sitting part 20.

More specifically, the front edge 24A cooperates with the floor 200 of the vehicle in the accommodating position and with the seatback part 10 in the reversed position, whilst the rear edge 24B cooperates with the seatback part 10 in the accommodating position and with the floor 200 of the vehicle in the reversed position.

Thus the front edge 24A of the sitting part 20 (FIGS. 2 to 5) carries the first means for mounting 41, the second means for hooking 52 and the second means for cooperation 72 with the lock, whilst the rear edge 24B (FIGS. 1, 3, 4 and 5) carries the second means for mounting 42, the first means for hooking 51 and the first means for cooperation 71 with the lock 31.

More specifically, the floor of the vehicle according to the invention comprises at least one mounting lug and the means for mounting the sitting part on the floor of the vehicle comprise at least one receiving slot designed to be traversed by said mounting lug.

In this case, two mounting lugs 211 are provided in the floor 200 of the vehicle (FIG. 6) and two receiving slots 41A, 42A (FIGS. 4 and 5) for each first 41 and second 42 means for mounting.

Figure 6:
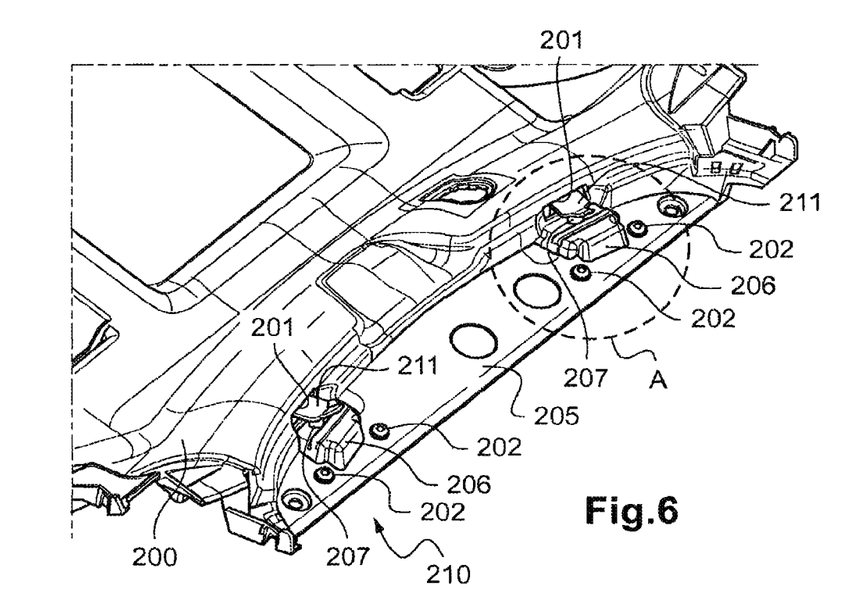
FIG. 6 is a schematic perspective view of the complementary means for mounting of the floor of the vehicle of FIG. 3.
Figure 7:
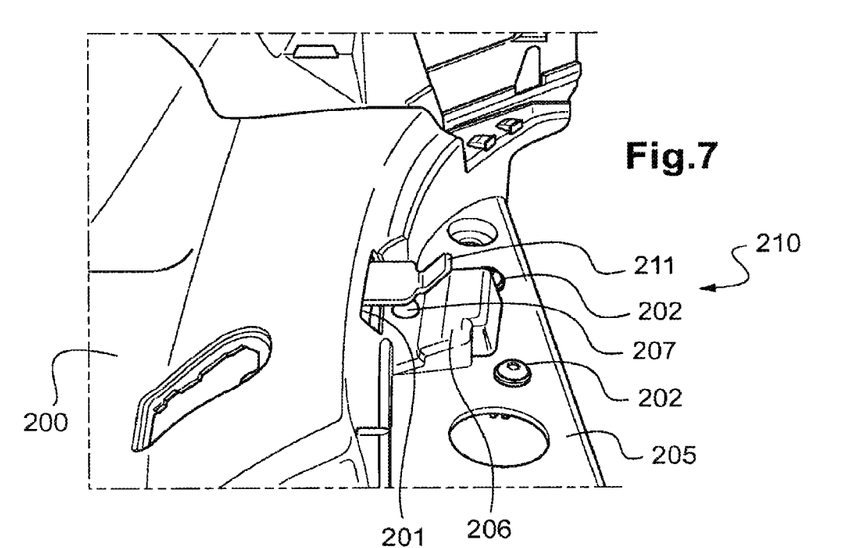
FIG. 7 is a schematic enlarged view of the area A of FIG. 6.

The floor 200 comprises a reinforced portion 205 designed to receive the front or rear edge of the sitting part 20 which bears against this reinforced portion of the floor 200. Each mounting lug 211 protrudes from the floor 200 via an aperture 201 of this floor, formed in a substantially vertical part of the reinforced portion 205 of this floor 200 (FIGS. 6 and 7).

Each mounting lug 211 (see FIG. 8) has the overall shape of a hook, one end thereof forming a support 212 provided with two orifices for the passage of a fixing screw 202 designed to secure this mounting lug 211 to the floor 200 and the other free end protrudes through the aperture 201 of the floor 200 to cooperate by retention with the sitting part 20.

Figures 8, 9:
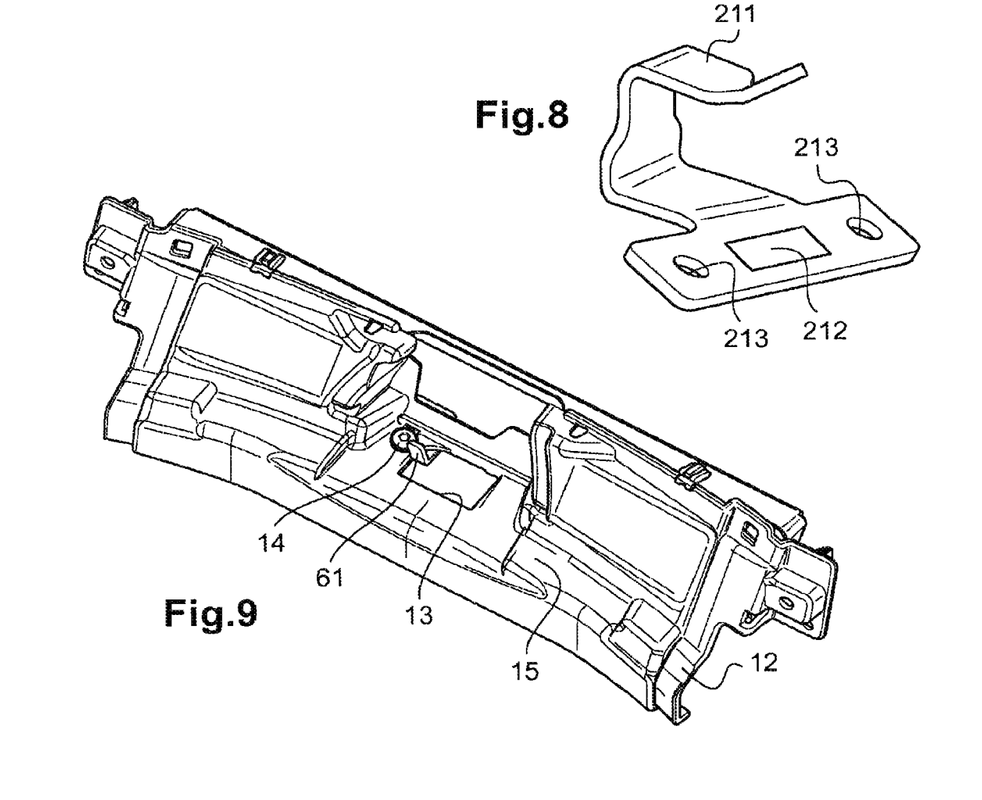
FIG. 8 is a schematic perspective view of a mounting lug of the floor of the vehicle according to the invention.
FIG. 9 is a schematic perspective view of the complementary means for hooking of the seatback part of the seat of FIG. 1.

This free end of the mounting lug 211 is angled back: it comprises a first straight branch which passes across the aperture 213 and a second straight branch which extends toward the exterior of the mounting lug 211 forming an angle of between 110 and 150 degrees with the first branch. This shape of the mounting lug 211 provides a certain degree of flexibility thereto.

Figure 4:
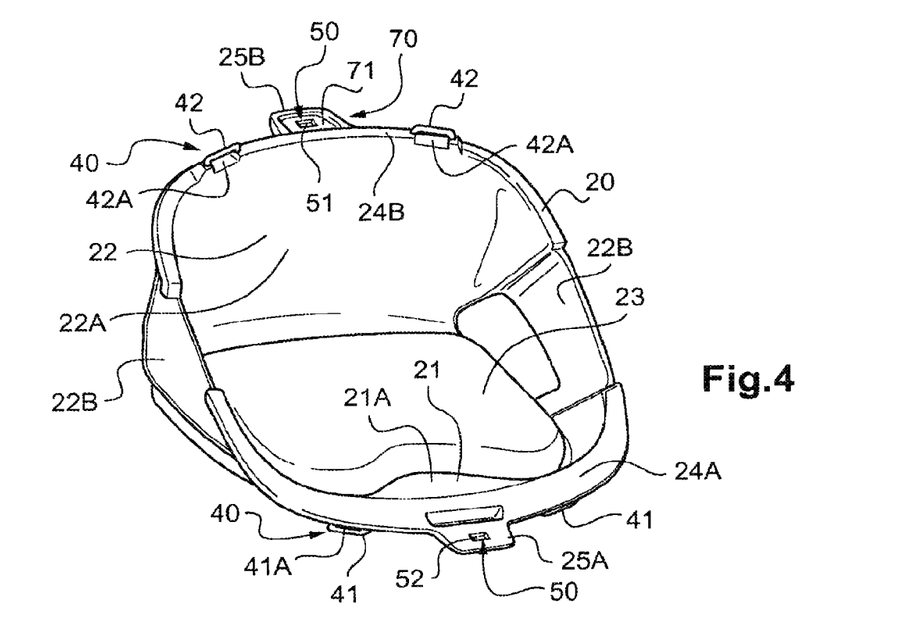
FIG. 4 is a schematic perspective view of the sitting part of FIG. 1 in its accommodating position.
Figure 5:
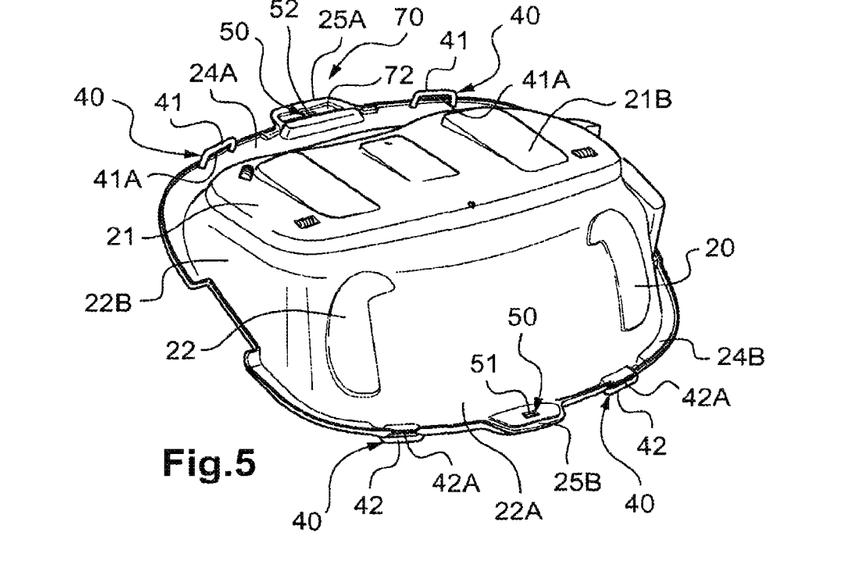
FIG. 5 is a schematic perspective view of the sitting part of FIG. 1 in its reversed position.

Each of the receiving slots 41A, 42A for the means for mounting 40 of the sitting part 20 is delimited by an arcuate portion rising from the front 24A or rear 24B edge of the sitting part 20 (FIGS. 4 and 5).

Each arcuate portion rises from the face of the front 24A or rear 24B edge which is oriented toward the floor of the vehicle in the corresponding position of the sitting part 20.

As shown in FIGS. 4 and 5, the arcuate portions of the first means for mounting 41 provided on the front edge 24A rise from the lower face of this front edge 24A, oriented toward the floor 200 in the accommodating position of the sitting part 20. The arcuate portions of the second means for mounting 42 provided on the rear edge 24B rise from the upper face of this rear edge 24B, oriented toward the floor 200 in the reversed position of the sitting part 20.

Each arcuate portion rises so as to protrude slightly above the corresponding face of the relevant edge and forms therewith the receiving slot of the corresponding mounting lug 211 of the floor 200.

The particular arrangement of the arcuate portions forming the receiving slots and the mounting lugs 211 means that the sitting part 20 is not able to be dismantled from the floor by a simple translatory movement of this sitting part 20.

These means for mounting 40 permit the displacement of said sitting part, in this case at least partially by pivoting, from each of its accommodating and reversed positions into released positions to release the means for hooking 50 of the sitting part 20 from their cooperation with said complementary means for hooking 60 of the seatback part 10 and, in the reverse pivoting direction, to establish the cooperation of the means for hooking 50 of the sitting part 10 with said complementary means for hooking 60 of the seatback part 10.

As explained below, the means for mounting 40 of the sitting part 20 are actually means for pivotable mounting on the floor 200.

Figures 10, 11:
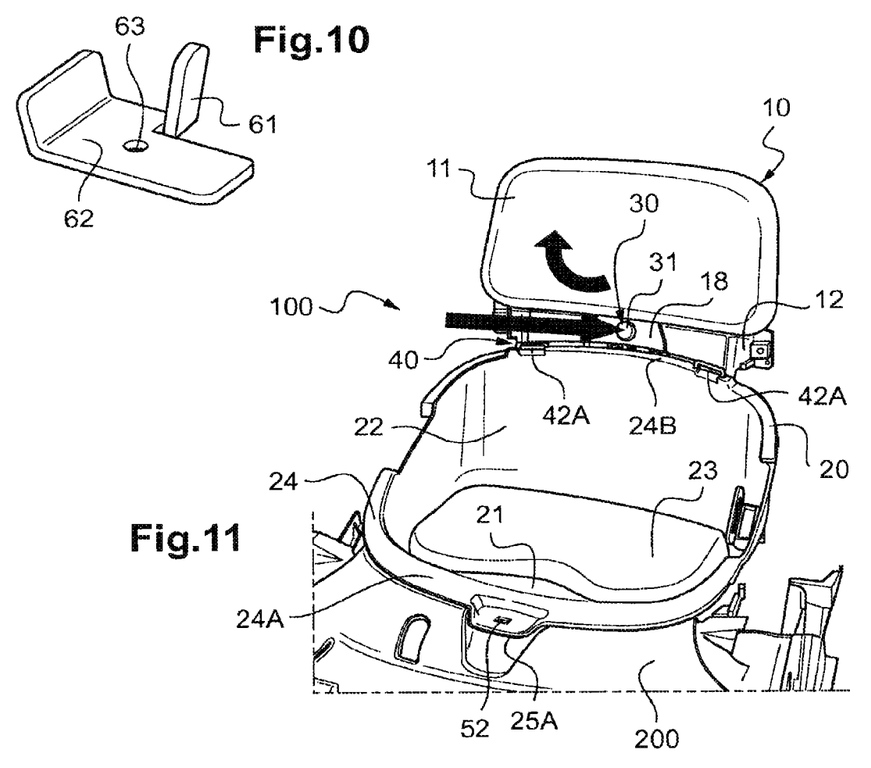
FIG. 10 is a schematic perspective view of the hooking lug of the seatback part.
FIGS. 11 to 14 are schematic views of the seat of FIG. 1 at several key steps of the reversal of the sitting part.

In this case, complementary means for hooking 60 of the seatback part 10 comprise a single hooking lug 61 which protrudes from the seatback part 10 (FIGS. 9 and 10).

More specifically here, this hooking lug 61 is attached to the fixed part 12 of the seatback part 10. This fixed part 12 of the seatback part 10 is arranged between the sitting part 20 and the mobile part 11 of the seatback part 10. The fixed part 12 of the seatback part 10 comprises a metal framework fixed to the structure of the passenger compartment of the vehicle and a molded covering made of plastics material.

This covering made of plastics material comprises a step 15, the front 24A or rear 24B edge of the sitting part 20 bearing against said step.

The hooking lug 61, shown more particularly in FIG. 10, is produced from metal.

This hooking lug 61 protrudes from the fixed part 12 of the seatback part 10 via an aperture 13 formed in the step 15 of this fixed part 12. The frame of this aperture is substantially horizontal and the hooking lug 61 protrudes from the aperture at an angle relative to the frame, preferably of between 60 and 80 degrees.

The hooking lug 61 comprises a support 62 provided with an orifice 63 for the passage of a fixing screw 14 fixing the support 62 of the hooking lug 61 onto the frame of the aperture 13 of the fixed part 12 of the seatback part 10.

Each of the first 51 and second 52 means for hooking of the sitting part 20 comprises an orifice 51, 52 designed to be traversed by said hooking lug 61 in the corresponding accommodating position or reversed position of the sitting part 20.

The orifices 51, 52 of the means for hooking 50 of the sitting part 20 are formed in the hollow portion 71, 72 forming the keeper of the lock 31 in each accommodating position or reversed position. The tongue 25A, 25B of the front and rear edges has, corresponding to the hollow portion 71, 72, a protrusion which is housed in the aperture 13 of the fixed part 12 of the seatback part 10.

The size of each orifice 51, 52 is such that in order to release the sitting part 20 from the hooking lug 61 it is necessary to apply to the sitting part 20 a specific pivoting movement about an axis passing through the mounting lugs 211 of the floor 200.

The mounting lugs are not parallel with one another here but the clearance present between each mounting lug and the corresponding arcuate portion permits this pivoting movement.

Said locking means 30 are designed to block the pivoting of the sitting part 20 in each of the accommodating and reversed positions, as explained in more detail below.

Method

The use of the seat according to the invention will now be described in more detail.

The sitting part is initially illustrated in its accommodating position shown in FIG. 1.

In this locked accommodating position, the front edge 24A of the sitting part 20 is housed in the reinforced portion 205 of the floor 200. The mounting lugs 211 of the floor 200 pass through the receiving slots 41A of the sitting part 200.

The rear edge 24B of the sitting part 20 rests on the step 15 of the fixed part 12 of the seatback part 10. The protrusion of the tongue 25B of the rear edge 24B is housed in the aperture 13 of the step 15 of the fixed part 12 of the seatback part 10.

The bolt of the lock 31 is engaged in the hollow portion 71 of the tongue 25B and the hooking lug 61 passes through the orifice 51 formed in this hollow portion 71.

Thus, the rear edge 24B of the sitting part 20 is pressed against the seatback part 10.

The pivoting of the sitting part 20 in this accommodating position is thus blocked by the lock 31.

When the user wishes to return the sitting part 20 of the seat 100, either to arrange personal effects in the storage compartment formed by the reversed sitting part or to sit a child on the reversed sitting part, the following steps are carried out.

Firstly, the user introduces a suitable key into the cylinder of the lock 31 which is accessible from the front face of the seatback part 10.

The user unlocks the sitting part: the key is turned in the lock 31, which causes the movement of the bolt of the lock: this is pivoted or translated, so as to come out of the hollow portion 71 of the rear edge 24B. The pivoting of the sitting part 20 is thus permitted (FIG. 11).

However, the sitting part 20 remains held on the floor and on the seatback part 10 by the cooperation of the means for mounting and the means for hooking of the sitting part 20 with complementary means disclosed above.

Then, in order to permit the pivoting of the sitting part 20, the user detaches the removable part 11 of the seatback part 10 from its fixed part 12.

The removable part 11 comprises the portion 18 of the framework of the seatback part on which the lock is mounted 31.

The removable part 11 located above the rear edge 24B of the sitting part 20 is thus removed.

Figure 12:
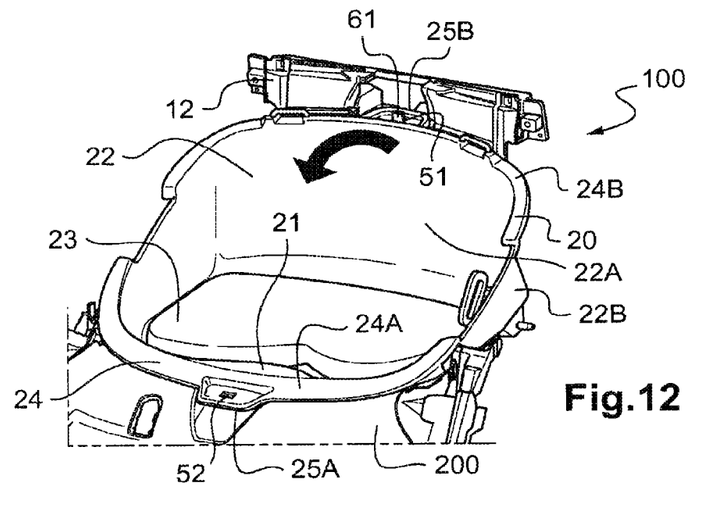

The user then grips the rear edge 24B of the sitting part 20 and pivots said sitting part about the axis passing through the mounting lugs 211 of the floor. In other words, the user pivots the sitting part 20 about a pivot axis located in the vicinity of the front edge 24A (FIG. 12).

Thus the sitting part 20 is displaced toward a first released position in which the first means for hooking 51 on the seatback part 10 of the seat 100 are released from their cooperation with the hooking lug 61 of this seatback part. In practice, the user pivots the sitting part 20 until the hooking lug 61 comes out of the corresponding orifice 51 of the sitting part 20.

This pivoting is carried out at an angle in the order of 20 to 40 degrees.

Then the user displaces the sitting part 20 so as to release the first means for mounting 41, in the accommodating position, of the sitting part 20 from their cooperation with the complementary means for mounting of the floor of the vehicle. In this case, the user raises the sitting part 20 until the mounting lugs 211 of the floor 200 come out of the corresponding slots 41A.

The user reverses the sitting part 20 so as to arrange its base panel 21 between the seatback part 10 and its side panel 22.

Figure 13:
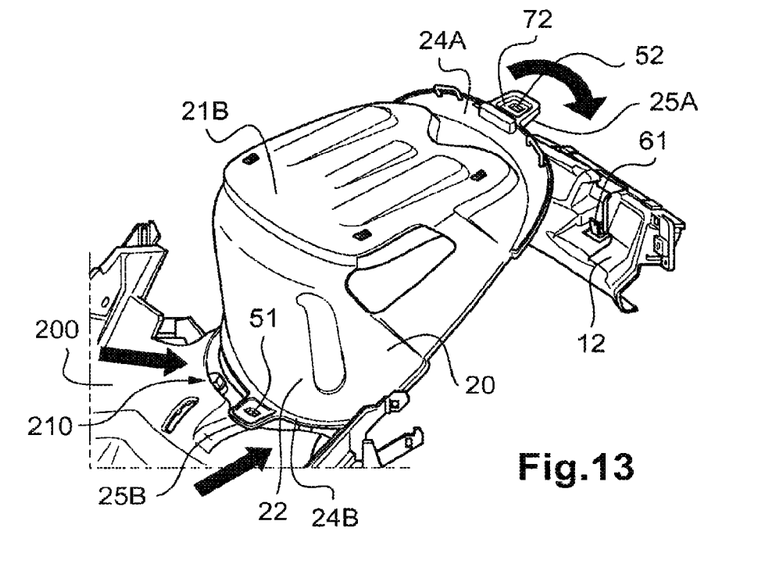

The user slides the mounting lugs 211 of the floor 200 into the slots 42A of the rear edge 24B of the sitting part 20 in order to place, in the reversed position, the second means for mounting 42 of the sitting part 20 in cooperation with the complementary means for mounting 211 of the floor 200 of the vehicle. The sitting part 20 is then located in a second released position in which the second means for hooking 50 do not cooperate with the hooking lug 61 of the seatback part 10 (FIG. 13).

To facilitate this operation and to improve the comfort of the user, (see FIGS. 6 and 7) provided below the mounting lugs 211 of the floor 200, at the bottom of the reinforced portion 205, are stop elements 206 which are designed to limit the path of the mounting lugs 211 when they flex, and flexible damping elements 207 which are produced, for example, from rubber and which dampen the impacts between the mounting lugs 211 and the bottom of the reinforced portion 205 of the floor 200. The vibrations and noises associated with these impacts are thus limited.

The user then displaces the sitting part 20 so as to establish the cooperation between the means for hooking 52 of the sitting part 20 in the reversed position and the complementary means for hooking 60 of the seatback part 10.

Figure 14:
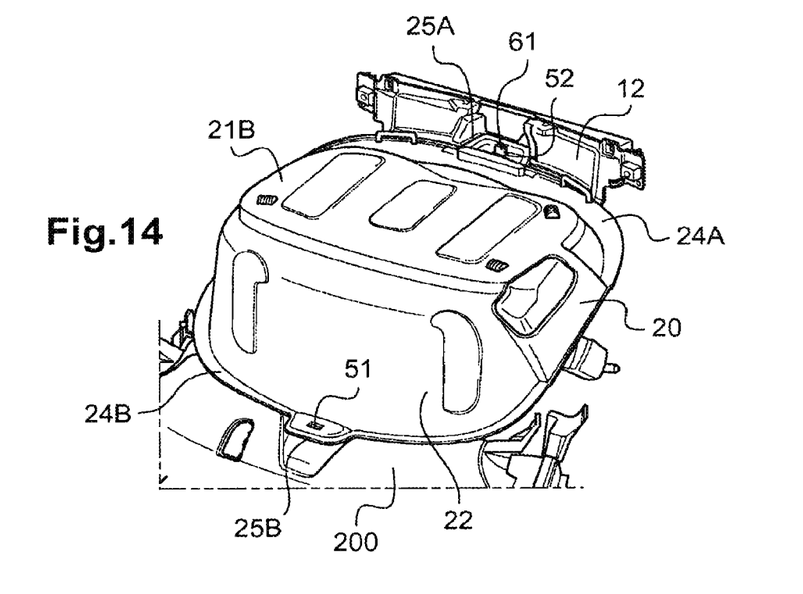

In practice, the user then pivots said sitting part 20 about the axis passing through the mounting lugs 211, until, in the reversed position, the second means for hooking 52 of the sitting part 20 on the seatback part 10 of the seat 100, cooperate with complementary means for hooking 61 of the seatback part 10, i.e. until said hooking lug 61 of the seatback part 10 slides in the orifice 52 of the corresponding sitting part (FIG. 14).

The user then mounts the removable part of the seatback 11 on its fixed part 12, for example by clipping or interlocking.

Finally, the user locks said locking means: the key is turned in the lock 31 so as to displace the bolt so that it is housed in the hollow portion 72 of the sitting part 20.

At the same time, the key also displaces a hook of the removable part 11 of the seatback part 10 which is hooked onto complementary means for receiving the fixed part 12 so as to lock the position of this removable part 11 of the seatback part.

The sitting part 20 is then located in the reversed locked position of FIG. 2.

Due to the arrangement of the means for mounting, hooking and locking described above, the locking of the lock prevents any pivoting of the sitting part 20 which prevents the dismantling of this sitting part 20 and thus the opening of the storage compartment.

The storage space located below the sitting part is thus secured.

The invention claimed is:

1. A motor vehicle seat comprising:
   a seatback part;
   a sitting part, the sitting part comprising a base panel bordered at least partially by a side panel, the sitting part is configured to be mounted on the floor of the vehicle in two different positions including a first accommodating position wherein the side panel is attached directly to the seatback part and is positioned between the seatback part and the base panel of the sitting part, and a second reversed position wherein the base panel is attached directly to the seatback part and extends between the seatback part and the side panel of the sitting part; and locking means for locking the sitting part in at least one of the two accommodating and reversed positions, at least part of the locking means belonging to the seatback part.

2. The motor vehicle seat as claimed in claim 1, wherein the locking means comprises a key.

3. The motor vehicle seat as claimed in claim 1, wherein the sitting part further comprises means for hooking configured to cooperate, in at least one of its accommodating and reversed positions, with complementary means for hooking of the seatback part.

4. The motor vehicle seat as claimed in claim 3, wherein the means for hooking of the sitting part on the seatback part comprises a first means for hooking on the seatback part in the accommodating position and a second means for hooking on the seatback part in the reversed position, each being configured to cooperate with a same complementary means for hooking of the seatback part.

5. The motor vehicle seat as claimed in claim 4, wherein the complementary means for hooking of the seatback part comprises a hooking lug which protrudes from the seatback part and each first and second means for hooking of the sitting part comprises an orifice configured to be traversed by the hooking lug in the corresponding accommodating or reversed position of the sitting part.

6. The motor vehicle seat as claimed in claim 3, wherein the sitting part includes means for mounting of the sitting part that permits displacement of the sitting part from each of its accommodating and reversed positions into released positions to release the means for hooking of the sitting part from their cooperation with the complementary means for hooking of the seatback part and, in the opposing direction, to establish the cooperation of the means for hooking of the sitting part with the complementary means for hooking of the seatback part.

7. The motor vehicle seat as claimed in claim 1, wherein the locking means is configured to prevent the displacement of the sitting part in each of the accommodating and reversed positions.

8. The motor vehicle seat as claimed in claim 1, wherein the sitting part includes at least one receiving slot which is configured to be traversed by a mounting lug of the floor of the vehicle to mount the sitting part on the floor of the vehicle.

9. The motor vehicle seat as claimed in claim 1, wherein the locking means comprises a locking element belonging to the seatback part and configured to be displaced between a locked position and a released position and a housing belonging to the sitting part and configured to accommodate the locking element in the locked position, the locking element of the seatback part in the locked position and the housing of the sitting part being arranged to prevent displacement of the sitting part.

10. The motor vehicle seat as claimed in claim 1, wherein the seatback part comprises at least one removable part configured to be entirely detached from a remainder of the seat.

11. The motor vehicle seat as claimed in claim 10, wherein the locking means of the sitting part is carried by the removable part of the seatback part and is configured to prevent displacement of the removable part of the seatback part.

12. A motor vehicle comprising a seat as claimed in claim 1 and the floor comprising complementary means for mounting configured to cooperate for retention with means for mounting the seat in each of its accommodating and reversed positions.

13. A motor vehicle seat comprising:

a seatback part;

a sitting part, the sitting part comprising a base panel bordered at least partially by a side panel and means for mounting on the floor of the vehicle in two different positions of: a first accommodating position wherein the side panel runs at least partially in the extension of the seatback part, between the seatback part and the base panel of the sitting part, and a second reversed position wherein the base panel extends between the seatback part and the side panel of the sitting part; and locking means for locking the sitting part in at least one of the two accommodating and reversed positions, at least part of the locking means belonging to the seatback part, wherein the locking means comprises a key.

14. A motor vehicle seat comprising:

a seatback part;

a sitting part, the sitting part comprising abase panel bordered at least partially by a side panel and means for mounting on the floor of the vehicle in two different positions of: a first accommodating position wherein the side panel runs at least partially in the extension of the seatback part, between the seatback part and the base panel of the sitting part, and a second reversed position wherein the base panel extends between the seatback part and the side panel of the sitting part; and locking means for locking the sitting part in at least one of the two accommodating and reversed positions, at least part of the locking means belonging to the seatback part, wherein the sitting part further comprises means for hooking configured to cooperate, in at least one of its accommodating and reversed positions, with complementary means for hooking of the seatback part.

* * * * *